United States Patent
Kumar

(10) Patent No.: US 7,069,270 B1
(45) Date of Patent: Jun. 27, 2006

(54) AUTOMATED METHOD AND MECHANISM FOR CONVERTING A SINGLE INSTANCE APPLICATION TO A MULTIPLE INSTANCE APPLICATION

(75) Inventor: Raj Kumar, Brooklyn, NY (US)

(73) Assignee: Oracle International Corporation, Redwood Shores, CA (US)

( * ) Notice: Subject to any disclaimer, the term of this patent is extended or adjusted under 35 U.S.C. 154(b) by 483 days.

(21) Appl. No.: 10/360,257

(22) Filed: Feb. 5, 2003

(51) Int. Cl.
- G06F 7/00 (2006.01)
- G06F 17/30 (2006.01)
- G06F 17/00 (2006.01)
- G06F 9/44 (2006.01)

(52) U.S. Cl. .................. 707/101; 707/10; 707/102; 717/171

(58) Field of Classification Search ............ 707/103 X, 707/103 R, 10, 104.1, 201, 202, 101, 102; 709/225, 231; 705/36 R; 717/171
See application file for complete search history.

(56) References Cited

U.S. PATENT DOCUMENTS

2002/0083183 A1* 6/2002 Pujare et al. ............... 709/231

OTHER PUBLICATIONS

Mahapatra et al., Oracle Parallel Processing, O'Reilly Publishing, Aug. 2000, ISBN: 1-56592-701-X.*

Bauer et al., Oracle8 Parallel Server Concepts & Administration Release 8.1.5, 1999.*

Bauer et al., "Orcale8i Parallel Server Concepts & Administration", Release 8.1.5, 1999.*

Oracle Corporation, Sandra Cheevers, "Oracle 9i Database Summary, An Oracle White Paper," May 2002, pp. 1-35.

Oracle Corporation, Daniela Hansell, "Managing Oracle9i Real Application Clusters, An Oracle White Paper," Mar. 2001, 12 pages.

Oracle Corporation, "Oracle9i Real Application Clusters Administration," Release 1 (9.0.1), Part No. A89869-02, 1996-2001, Ch. 1-4, 9, 98 pages.

Oracle Corporation, "Oracle9i Real Application Clusters Installation and Configuration," Release 1 (9.0.1), Part No. A89868-02, 1996-2001, Ch. 4-5, 33 pages.

* cited by examiner

Primary Examiner—Jeffrey Gaffin
Assistant Examiner—Michael J. Hicks
(74) Attorney, Agent, or Firm—Hickman Palermo Truong & Becker LLP; John D. Henkhaus

(57) ABSTRACT

A method and apparatus for converting a single instance computer application to a multiple instance application includes disabling the single instance application and linking the executable files associated with the single instance application to routines in a library that includes routines for use by a multiple instance application. Multiple instance metadata that represents the structure of the multiple instance application is automatically created based on metadata that represents the structure of the single instance application. The data from the single instance application is imported to complete the conversion to a multiple instance application.

31 Claims, 6 Drawing Sheets

AUTOMATED METHOD AND MECHANISM FOR CONVERTING A SINGLE INSTANCE APPLICATION TO A MULTIPLE INSTANCE APPLICATION

FIELD OF THE INVENTION

The present invention relates generally to computer software applications and, more specifically, to techniques for converting a single instance application to a multiple instance application.

BACKGROUND OF THE INVENTION

Software applications typically are configured to take one of two forms. Most applications can be installed and configured as a single instance application that operates as a relatively independent bundle of functionality and that typically executes on a single node or hardware platform. By contrast, some applications can be configured as a multiple instance application and installed on a cluster of nodes. As such, each node typically executes an instance of the application, with each instance providing the same or similar functionality and with each node providing appropriate resources, such as processing and memory resources. Further, each node in a cluster is connected to other nodes in the cluster and typically shares resources, such as data items, with other nodes in the cluster. For example, a database system may run on each node in a cluster and manage data stored on data blocks on shared storage, such as disk storage devices. Hence, a properly configured cluster environment provides enhanced scalability and availability of resources in relation to software applications executing in the cluster environment.

A scalable cluster is a cluster to which resources may be added to proportionally increase the capacity of the cluster as a whole. A resource may be, for example, a computer, a CPU, a storage device, interconnect bandwidth, or dynamic memory per computer. Typically, capacity is measured according to some measure of business growth, such as the number of users, web page hits per second, transactions per period of time, and/or terabytes of data.

One problem with a single instance application is that it is a single point of failure. Once the application fails, all of the clients of the application can no longer use the services provided by the application. Further, a single instance application can be overburdened with service requests from clients, thus resulting in reduced throughput and denial-of-service attacks.

Some software applications can be configured to take either of the two forms, that is, configured in either a single instance environment or a multiple instance environment. However, single instance applications and multiple instance applications have historically existed in their own domains, with no method or mechanism for converting the former to the latter.

Based on the foregoing, it is clearly desirable to provide an automated mechanism for converting a single instance application to a multiple instance application.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
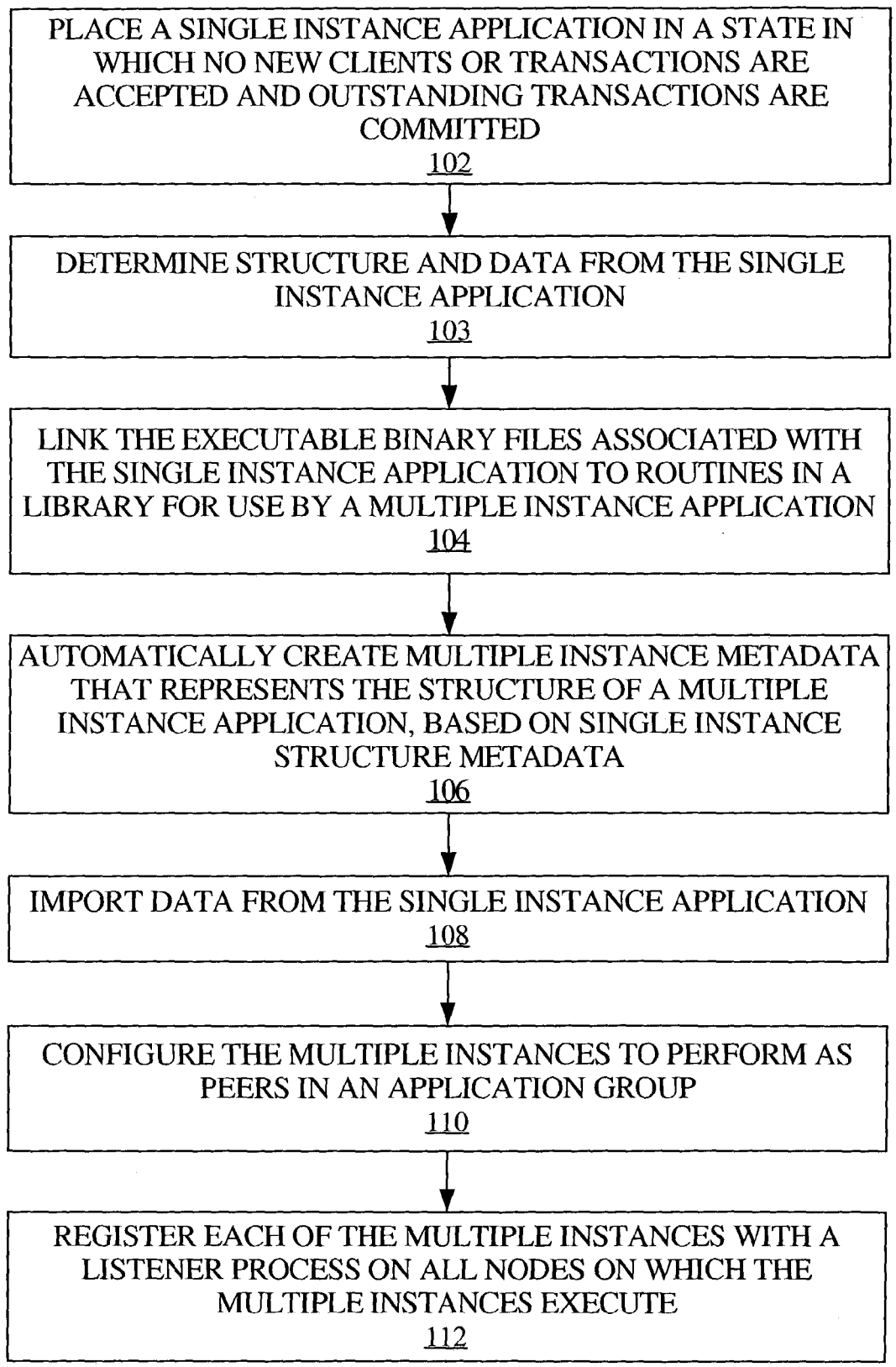
FIG. 1 is a flowchart that illustrates a method for converting a single instance computer software application to a multiple instance computer software application.

A method and mechanism are described for converting a single instance application to a multiple instance application. For a non-limiting example, a single instance database application may be converted to a multiple instance database application on a cluster of nodes, using the techniques described herein. These techniques may be implemented as an integrated set of administrative software tools.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Many state-based software applications, such as a database management system, consist of two parts: (1) metadata, and (2) data. After installing the binary executables, libraries, etc. for an application, metadata for the application needs to be constructed before the application can be started. In a database context, the metadata contains information about the structure or schema of the database, such as the amount of data, the number of data tables, the number of clients the database can support, and the like.

An automated method and apparatus for converting a single instance computer application to a multiple instance application includes capturing the metadata and structure of the single instance application. If not already installed, cluster software and multiple instance application software is installed. The single instance application is placed in a state in which it will accept no new clients or transactions and in which outstanding transactions are committed. The executable binary files associated with the single instance application are linked, or re-linked, to routines in a library that includes routines for use by the multiple instance application. Multiple instance metadata that represents the structure of the multiple instance application is automatically created based on metadata that represents the structure of the single instance application. The data from the single instance application is imported to complete the conversion to a multiple instance application.

The instances constituent to the multiple instance application (each of which is sometimes referred to herein as a "multiple instance") can be configured to perform as peers in an application group, whereby the instances can be managed individually or as a group. Furthermore, in one embodiment, each of the multiple instances is registered with respective listener processes on nodes on which the multiple instances execute, thus providing fail-over capability and load balancing for client requests to a set of multiple instances on a cluster.

In implementations in which the single and multiple instance applications are database applications, (1) separate storage resources can be allocated for undo information, and (2) redo threads can be created for each of the multiple instances.

A Method for Converting a Single Instance Application to a Multiple Instance Application FIG. 1 is a flowchart that illustrates a method for converting a single instance computer software application to a multiple instance computer software application. Preferably, although not a requirement, the method is implemented on a computing platform that is configured to support a shared cluster file system or shared raw disks. The method depicted in FIG. 1 may be performed by any number of computer-implemented code modules.

At block 102, a single instance application is placed in a shut-down state, in which it no longer accepts new clients or data transactions. In a database context, there may be open transactions present at the time of performance of block 102. In other words, there may be database transactions that have not yet been committed to persistent storage, such as a disk. Thus, the database is shut down so that no new transactions can be initiated, and the database is forced to commit all pending transactions. Furthermore, no new connections to the database are allowed. Block 102 is referred to as a normal shut-down of the single instance application. Block 102 may be performed through a command line tool that interfaces with the application and accepts administrative commands related to the application.

In conjunction with placing the single instance application in a normal shut-down state, in one embodiment, at block 103 the structure of the single instance application and any data associated with the single instance application is automatically captured or determined. For example, in a database application, metadata that represents the structure of the application and the data in the database are captured in a seed image. The seed image that contains the metadata and data is stored in a location in persistent memory for subsequent use.

In an implementation, the single instance application data is captured into a compressed file structure. In such an implementation, when the data from the single instance application is imported into the newly created multiple instance application at block 108, the compressed file structure is restored, as described in more detail below in reference to block 108.

The single instance database structure may be in the form of metadata or, for example, one or more control files. The type of information stored in a file representing the database structure may include, for example, the number of tables used to store the data, the types of data stored in each table, and the like. Each single instance metadata is usually unique to that instance. Some, but usually not all, of the information is applicable to a multiple instance configuration of the single instance application. However, once the application is converted to a multiple instance application, the database structure stored on the shared storage of the cluster is the same for each instance of the multiple instances.

Cluster Environment Context

A cluster is a group of independent servers that cooperate as a single system, with the primary components being processor nodes, a cluster interconnect, and a shared disk subsystem. A single instance application may be converted to a multiple instance application on a cluster, from either (1) a single instance running on a non-cluster machine or (2) a single instance running on a cluster. In the case of (1), cluster software is installed on one or more nodes of the cluster in which the multiple instances will execute. In the case of (2), there are three possible scenarios in which a single instance application can exist on a cluster machine: (a) the home node from which the single instance is running is cluster installed; (b) the home node from which the single instance is running is cluster installed but the cluster feature is disabled; and (c) the home node from which the single instance is running is not cluster installed.

In cases in which the process described herein is used to convert from a single instance on a cluster to multiple instances on the same cluster, the cluster software would already be installed. The cluster software, such as Oracle9i Real Application Clusters available from Oracle Corporation, provides for executing database transactions in a cluster environment and includes a library of routines that are used to run a database management system in a cluster or multiple instance environment.

Installation of cluster software typically includes, for example, selection of nodes to include in the installation, specification of the maximum number of nodes that can be supported by the cluster, specification of the type of file system used by the cluster, etc. Installation of application software on a cluster, which is different than cluster software, typically includes specification of the nodes of the cluster on which to install the application, the folder or data tree in which to install the application software, the location of the seed image (data) that was constructed from the single instance application and which will be used to populate the multiple instance application, and the like. If using a cluster file (shared) system, only one copy of the application software is needed. However, if not using a cluster file system, then a private copy of the application software is installed on each node.

At block 104, the single instance binaries, or executable files, are linked to routines included in one or more libraries, that is, cluster software libraries. The links between files that include the executable code of an application and libraries of executable routines that are part of or that support the application are required for the application to operate properly. These routines are implemented with logic that takes into account the intricacies of multiple instance environments and, therefore, are not necessarily configured with the same logic as the routines in the first libraries that are used by the single instance application. The process recognizes that it is operating in a cluster environment, e.g., it recognizes the existence of libraries in a system default location. Hence, the process automatically re-links the binaries with the cluster libraries, whereby the binaries become cluster-aware software.

Creation of Multiple Instance Metadata

At block 106, multiple instance metadata, which represents the structure of the multiple instance application, is automatically created based at least on the structure of the single instance application. The multiple instance metadata is used to support execution and operation of the multiple instances of the application.

In one implementation, the metadata is in the form of a control file. Given data elements or objects, a control file can be intelligently constructed to control the data elements or objects. The multiple instance metadata is different than the single instance metadata and can be constructed to change upon addition of a new instance beyond the maximum number of instances originally configured.

Figure 2:
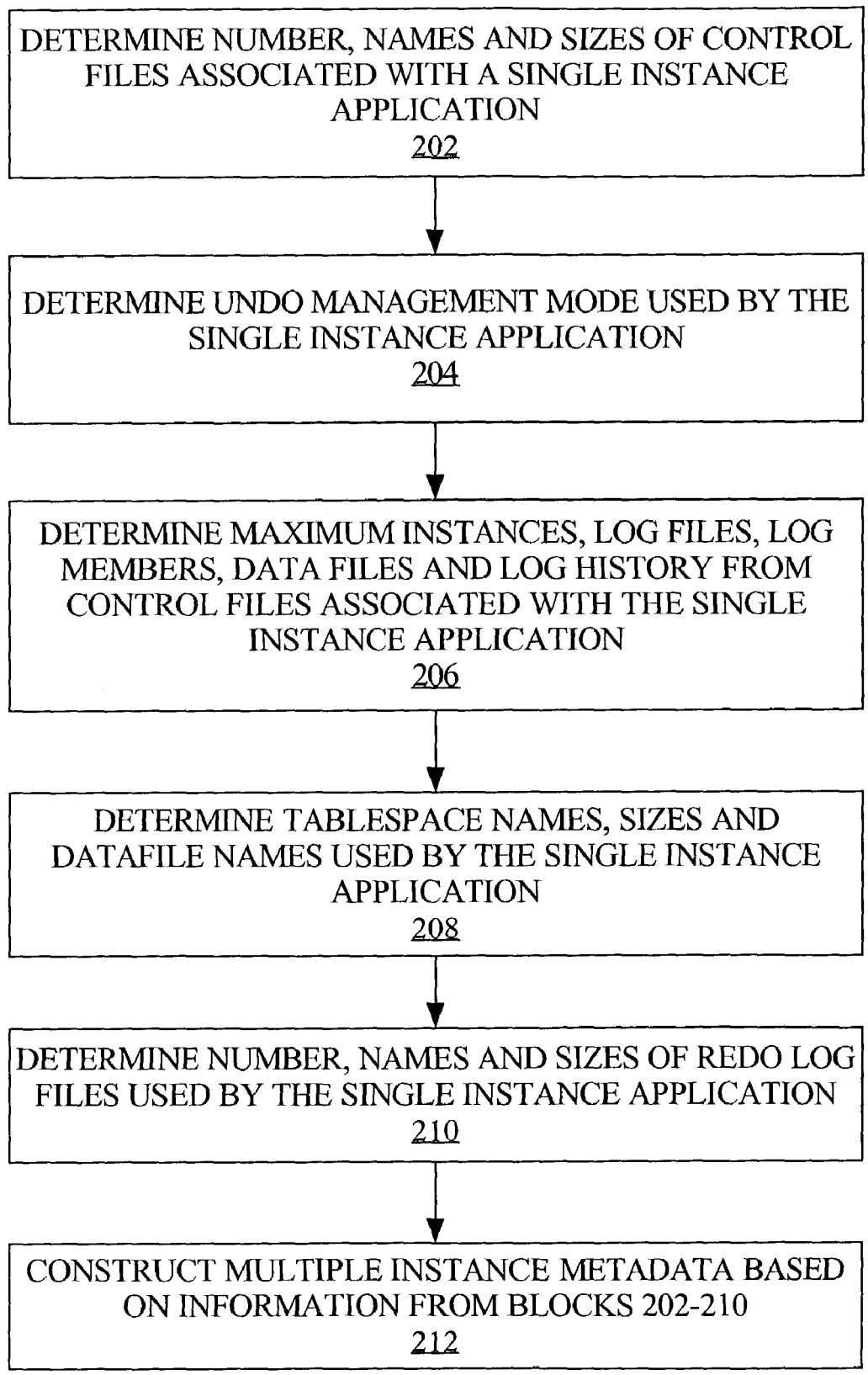
FIG. 2 is a flowchart that illustrates a process for automatically creating multiple instance metadata.

FIG. 2 is a flowchart that illustrates a process for automatically creating multiple instance metadata, such as at block 106 of FIG. 1. The process is able to interpret the single instance metadata. In one non-limiting implementation in the context of a conversion of a database application, the single instance metadata is analyzed to determine and use various information for automatically creating the multiple instance metadata, as illustrated in FIG. 2.

At block 202, the number, names and sizes of control files used by the single instance application are determined. The information of block 202 is determined based on the single instance metadata. At block 204, the undo management mode used by the single instance application is determined, e.g., AUTO or MANUAL.

Most database management systems keep records of transactions before they are committed to persistent storage, which is needed to rollback or undo changes to the database associated with commitment of the transactions. MANUAL undo management mode uses rollback segments to manage the undo information. AUTO undo management mode uses undo tablespace, which provides more control over how long undo information is retained and eliminates the complexity of managing rollback segments in certain environments. Rollback segments and undo tablespace are used, generally, to record data changes from the database in order to reconstruct a database block as it existed prior to a change to that data block, and are used in a number of ways. For example, rollback segments may be used to rollback SQL statements with data as it existed at the point in time when the SQL statement started.

At block 206, in the database context, the maximum number of instances, log files (e.g., redo log files), log members, data files, and size of log history are determined from the single instance control files. Alternatively, the maximum number of instances, log files, log members, data files, and log history can be derived from the cluster size. For example, the process can determine the maximum number of instances that can run on the cluster from the cluster configuration and, therefore, can reconstruct the foregoing information therefrom. Regardless of the method used to determine or estimate the foregoing information, appropriate memory is allocated to support each of the multiple instances, and the allocation is represented in, or implemented through, the multiple instance metadata.

At block 208, tablespace (i.e., persistent storage resource allocation) names and sizes, and tablespace data file names used by the single instance application are determined. Furthermore, if the undo mode of the single instance application was MANUAL, then the names of the rollback segments used by the single instance application are determined and saved.

At block 210, in the database context, the number, names and sizes of redo log files used by the single instance application are determined. Redo logs are used to record information necessary to reconstruct or redo changes made to the database by INSERT, UPDATE, DELETE, CREATE, ALTER or DROP operations. Redo entries are used for database recovery, if necessary following a failure or system crash. Finally, at block 212, the multiple instance metadata is constructed from the information determined at blocks 202–210.

Returning to block 106 of FIG. 1, in an embodiment in which the seed image is created at block 103 to capture both the metadata and data, creation of the multiple instance metadata is further based on the data portion of the seed image. That is, included in the metadata (e.g., control files) is identifying information associated with the data files over which the metadata controls. In this scenario, the data from the single instance application is reused in the multiple instance application.

In a non-limiting implementation in the context of a conversion of a database application, using the information determined based on blocks 202–210 of FIG. 2, the multiple instance metadata is automatically constructed according to the following description.

The multiple instance application may use the same number of control files as used by the single instance application. However, the names and/or sizes of the multiple instance control files may be different than those associated with the single instance application. For example, one reason for different names for the control files is based on the possibility that the multiple instance control files are stored on storage shared across multiple nodes of the cluster as opposed to that of the single instance application, which could be on node-private storage. In addition, the multiple instance application may use the same undo management mode as used by the single instance application.

The multiple instance application is implemented with a maximum number of instances according to: MAXINSTANCES=MAX(8*number of nodes in the cluster, 32). The default limit of 32 instances is based on heuristic data, and allows for addition of up to 32 instances before a control file, i.e., metadata, needs to be modified to go beyond the 32 instance limit.

A maximum number of log members is implemented according to: MAXLOGMEMBERS=MAX(number of log members used by single instance application, 3). Thus, the maximum number of log members for use by the multiple instance application is the greater of 3 or the maximum number used by the single instance application, obtained at block 206 of FIG. 2. A maximum number of log files is implemented according to: MAXLOGFILES={MAXINSTANCES*number of log files per instance (=2 in one implementation)*MAXLOGMEMBERS}; with an upper bound of 255. A maximum log history, which indicates the maximum number of archived redo logs that can be recorded in the log history of the control file before the space for these entries is recycled within the control file, is implemented according to: MAXLOGHISTORY=the number used by the single instance application.

According to one embodiment, the maximum number of data files is implemented according to: MAXDATAFILES=MAX(number of data files used by single instance application, 1024). Thus, the maximum number of data files for use by the multiple instance application is the greater of 1024 or the maximum number used by the single instance application, obtained at block 206 of FIG. 2.

Other non-limiting implementation details with respect to creation of the multiple instance metadata include using the same tablespace names for the multiple instance application as were used by the single instance application. If the undo management mode used by the single instance application was AUTO, then an additional tablespace is created for each additional instance of the multiple instance application. Cloning the undo tablespace attributes obtained or determined from the single instance application can be used to generate the additional undo tablespaces for the multiple instance application. The sizes and names of the multiple instance tablespace data files can vary from those used by the single instance application, based on the possibility that the data files are shared across multiple nodes of the cluster as opposed to that of the single instance application, which could be on node-private storage.

If the undo management mode used by the single instance application was MANUAL, then the rollback segments used by the single instance application are cloned, and can be named using any heuristic. For example, the names for the multiple instance rollback segments can be formulated as the name of the single instance rollback segment suffixed with each instance name. For an n-instance application, the number of rollback segments created is equal to (n*the number of rollback segments used by the single instance application).

For an n-instance application, the number of redo groups is equal to (n*the number of redo groups used by the single instance application) and the number of redo logs created is equal to (n*the number of redo logs used by the single instance application). The number of redo logs used by the single instance application is obtained at block 210 of FIG. 2. In one implementation, the minimum number of redo logs per redo thread is constrained to two to provide protection against one log corruption. The sizes and names of the multiple instance redo logs can vary from those used by the single instance application, based on the possibility that the multiple instance log files are stored on storage shared across multiple nodes of the cluster as opposed to that of the single instance application, which could be on node-private storage. The multiple instance redo logs are generated by cloning the redo logs that were obtained from the single instance application.

At block 108, data from the single instance application is imported into the newly created multiple instance application. For example, the data may be imported via an export/import mechanism. In the embodiment in which the seed image file was created at block 103 to capture both the metadata and the data, the data portion of the seed image is imported into the multiple instance application after decompressing the image file. In the database context, the image file represents the actual data from the single instance database application. Therefore, at this stage of the conversion process, a multiple instance database application, with data, has been created.

In one embodiment, at block 110, the multiple instances are configured to form an application group (also referred to as a service group), such that the instances recognize each other and perform as peers. Furthermore, as an application group, the multiple instances can be managed and administered as a group as well as individually. A manner in which the multiple instances are configured to form a service group is described in more detail in reference to FIG. 4B.

In one embodiment, at block 112, each of the multiple instances are cross-registered with listener processes of nodes in the cluster in which the multiple instances execute. Details associated with this step are described in reference to FIG. 3 and FIGS. 4A and 4B.

As a result of cross-registering each multiple instance with listener processes of its own node and other nodes of the cluster, fail-over capability is provided by the multiple instance application. For example, upon a failure of an instance on a first node on which the instance is executing, the listener on the first node can redirect client requests to instances on the remote nodes.

Furthermore, cross-registration of the multiple instances with node listener processes provides the capability for load balancing among the multiple instances. For example, if one instance is experiencing a significant service load, some of the incoming processing load can be balanced across the cluster by distribution of load to other instances that are, perhaps, experiencing less service load and can therefore service additional requests.

Figure 3:
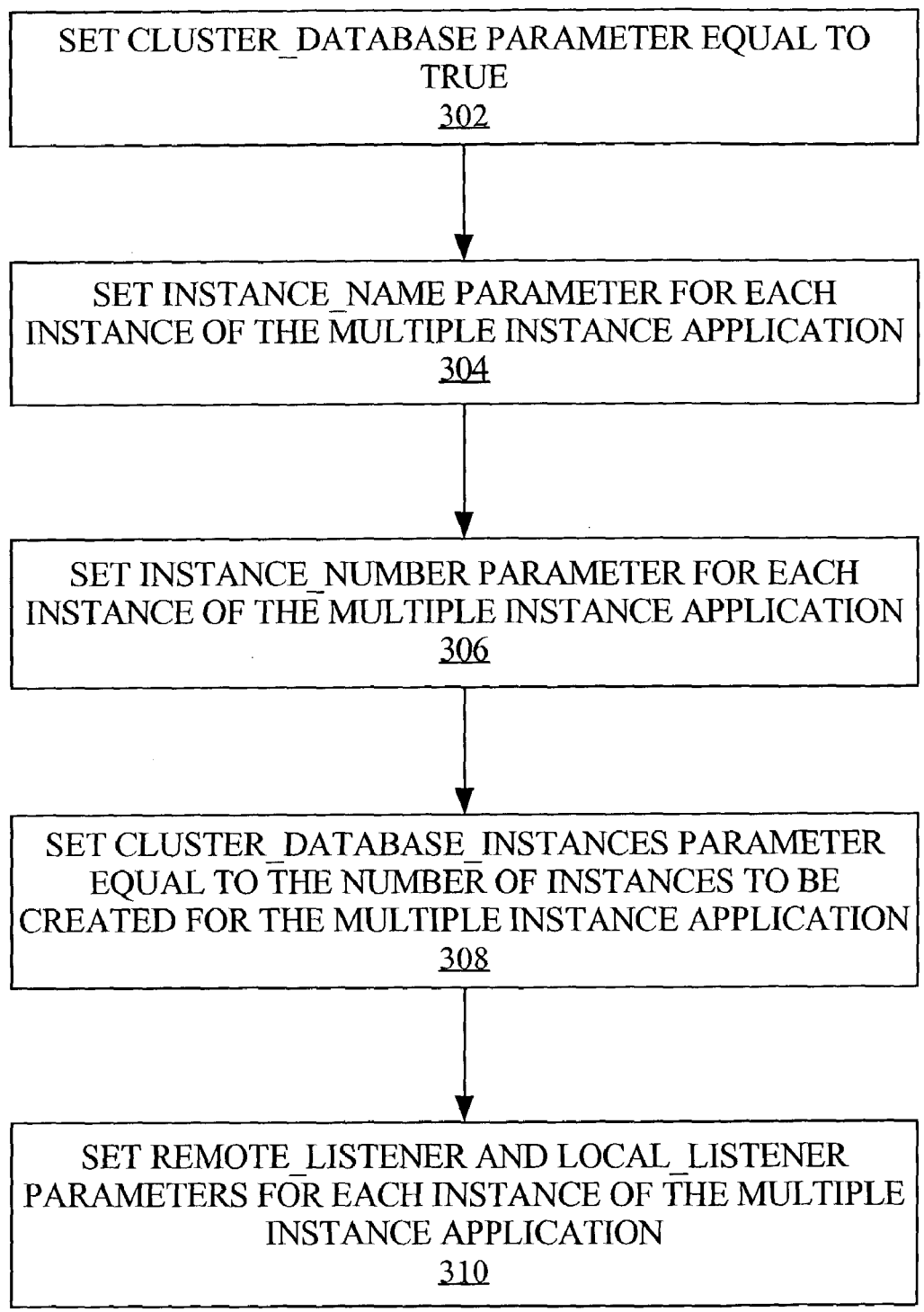
FIG. 3 is a flowchart that illustrates a process for configuring boot and initialization parameters for a multiple instance application.

Configuring Boot/Initialization Parameters for the Multiple Instance Application FIG. 3 is a flowchart that illustrates a process for configuring boot and initialization parameters for a multiple instance application. The process is described in the context of a conversion of a database application and its associated data and metadata, to which the techniques described herein are not limited. Furthermore, it is presented in the context of an Oracle Corporation database implementation, so specific parameter names are referenced. However, the techniques described herein are not limited to use of these parameter names, for similarly functioning parameters with different names are specifically contemplated and, therefore, fall within the scope of the invention as recited in the claims.

After installing the application software on all nodes of the cluster, at block 302 a parameter cluster_database, or similarly functioning parameter, is set to true, specifying that the application is a multiple instance application.

At block 304, a parameter instance_name, or similarly functioning parameter, is set for each multiple instance. Instance names are used at least for the purpose of registering the instances with node listener processes.

At block 306, a parameter instance_number, or similarly functioning parameter, is set for each multiple instance. That is, each instance is assigned an identifier, which can be used for memory and other resource allocation and management.

At block 308, a parameter cluster_database_instances, or similarly functioning parameter, is set equal to the number of instances to be created for the multiple instance application, which is used to improve memory usage.

At block 310, parameters remote_listener and local_listener, or similarly functioning parameters, are set for each multiple instance so that the multiple instances can be cross-registered with listener processes on other nodes of the cluster on which peer instances will execute. This step will provide to the cluster the capabilities for load balancing and for fail-over performance, as described above.

Figure 4A:
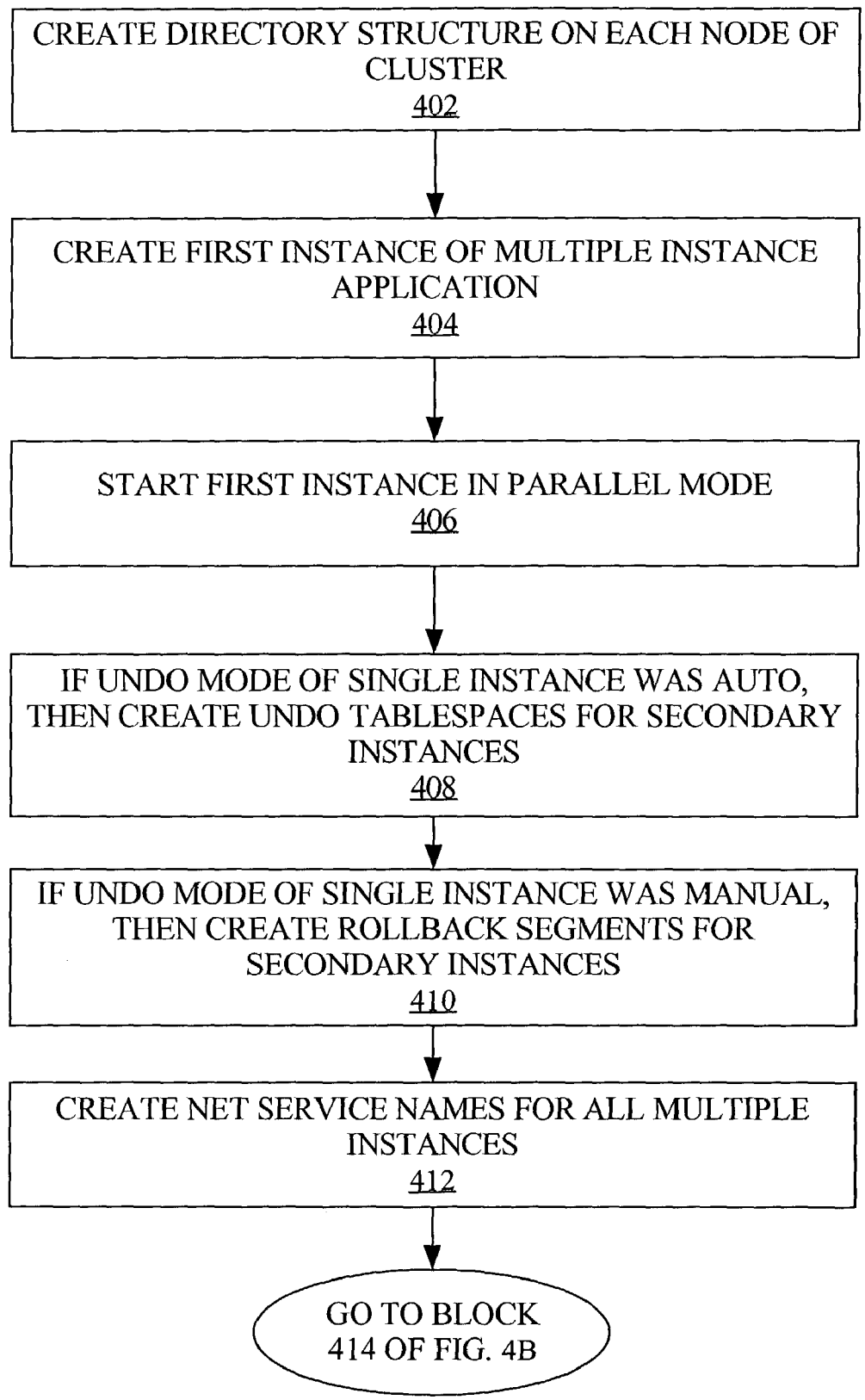
FIG. 4A and FIG. 4B are flowcharts that illustrate a process for automatically converting a single instance database to a multiple instance database.
Figure 4B:
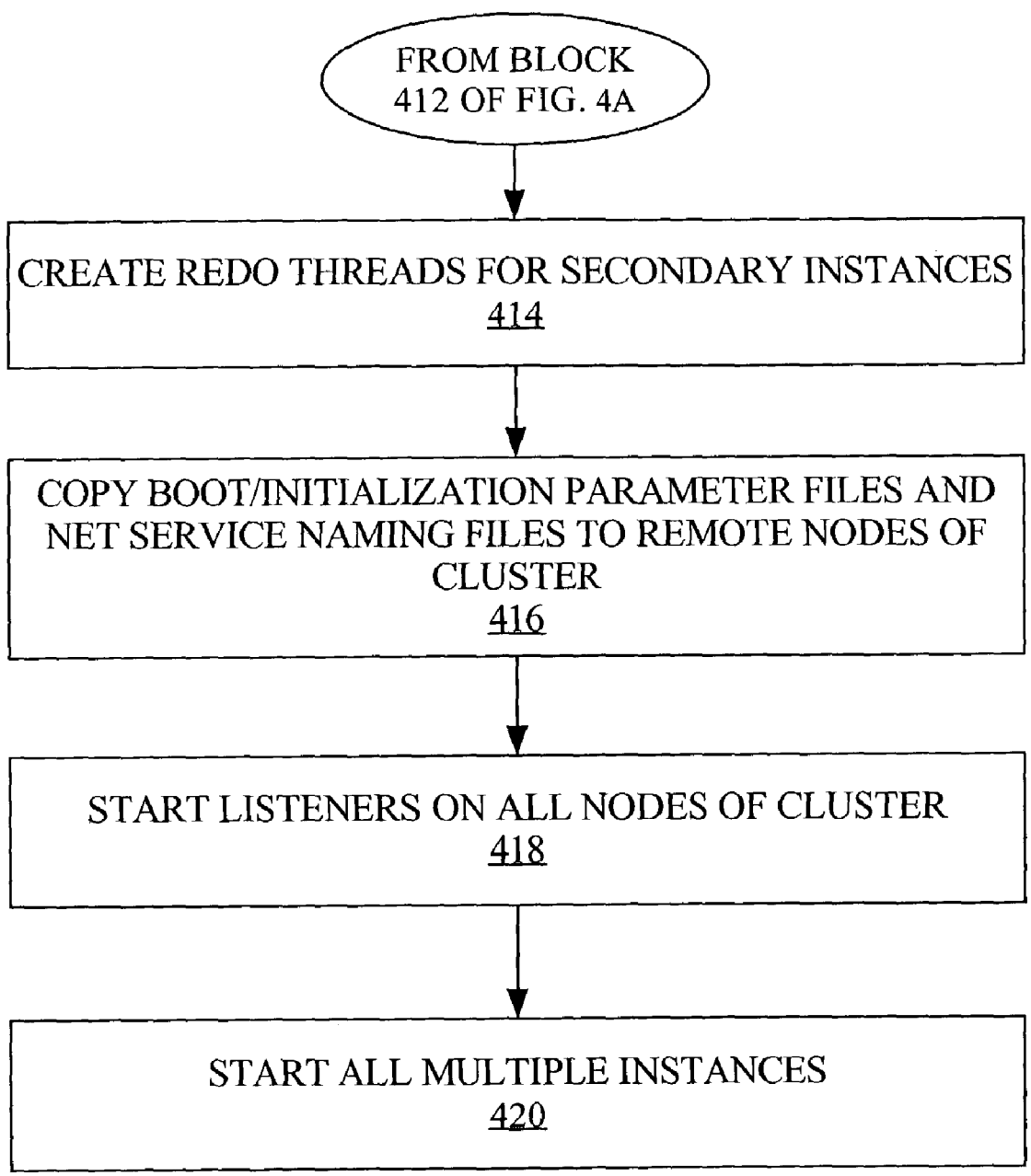

Process for Converting a Single Instance Database to a Multiple Instance Database FIG. 4A and FIG. 4B are flowcharts that illustrate a process for automatically converting a single instance database to a multiple instance database.

Beginning with FIG. 4A, at block 402 a directory structure is created on each node of a cluster on which an instance of the multiple instance database will execute. The directory will contain various files, such as parameter files, data files, trace files, dump files, and the like. An Oracle Flexible Architecture (OFA) directory is an example of a directory that could be created at block 402.

At block 404, the first instance of the multiple instance application is created. For example, the first instance is created by (1) setting a parameter cluster_database, or similarly functioning parameter, equal to "false"; and (2)

issuing a statement, such as a SQL statement (e.g., CREATE CONTROL FILE), to create one or more control files. This creates multiple instance metadata, as described in detail above.

At block 406, the first instance is started in parallel mode. For example, the first instance is stopped, the parameter cluster_database or similarly functioning parameter is set equal to "true" and the first instance is restarted. Consequently, the first instance will start in parallel, or cluster mode.

At block 408, undo tablespaces are created for the secondary instances of the multiple instances if the undo mode of the single instance database was AUTO mode. The secondary instances are the instances other than the first instance. If the undo mode of the single instance database was MANUAL mode, then rollback segments are created for the secondary instances, at block 410.

At block 412, net service names are created for the multiple instances. For example, net service names can be created for each multiple instance using a naming method that is compatible with LDAP (Lightweight Directory Access Protocol) or TNSNAMES.ora. Consequently, the multiple instances are configured to be recognized from a network and thus are capable of servicing requests from clients over a network.

Referencing FIG. 4B, at block 414, redo threads are created for the secondary instances. At block 416, boot/initialization parameter files, such as those configured according to the process of FIG. 3, are copied to the remote nodes of the cluster if not using a cluster file system. The remote nodes of the cluster are the nodes on which the secondary instances execute. Similarly, net service naming files, such as those created at block 412, and password files, are copied to the remote nodes.

At block 418, listener processes on each node are started, if they are not already running, and at block 420, all of the instances of the multiple instance database application are started. The first instance to start creates a Cluster Group Service group. This group can be named the same as the global database name. As other instances start, they join the group created by the first instance to start. Hence, all of the multiple instances of the service group can be managed and administered as a group. At this point in the process, a fully functional multiple instance database has now been created from a single instance database.

Multiple instance applications other than database applications can be created by conversion from a single instance application, as described in reference to FIG. 4A and FIG. 4B. However, in a non-database context certain steps may not be required. For example, some non-database applications may not utilize undo tablespaces, rollback segments and redo threads, and thus, the associated steps of blocks 408, 410 and 414 are not performed. Furthermore, conversion of non-database applications may require additional steps not depicted in the process of FIG. 4A and FIG. 4B.

Implementation Mechanism—Hardware Overview

Figure 5:
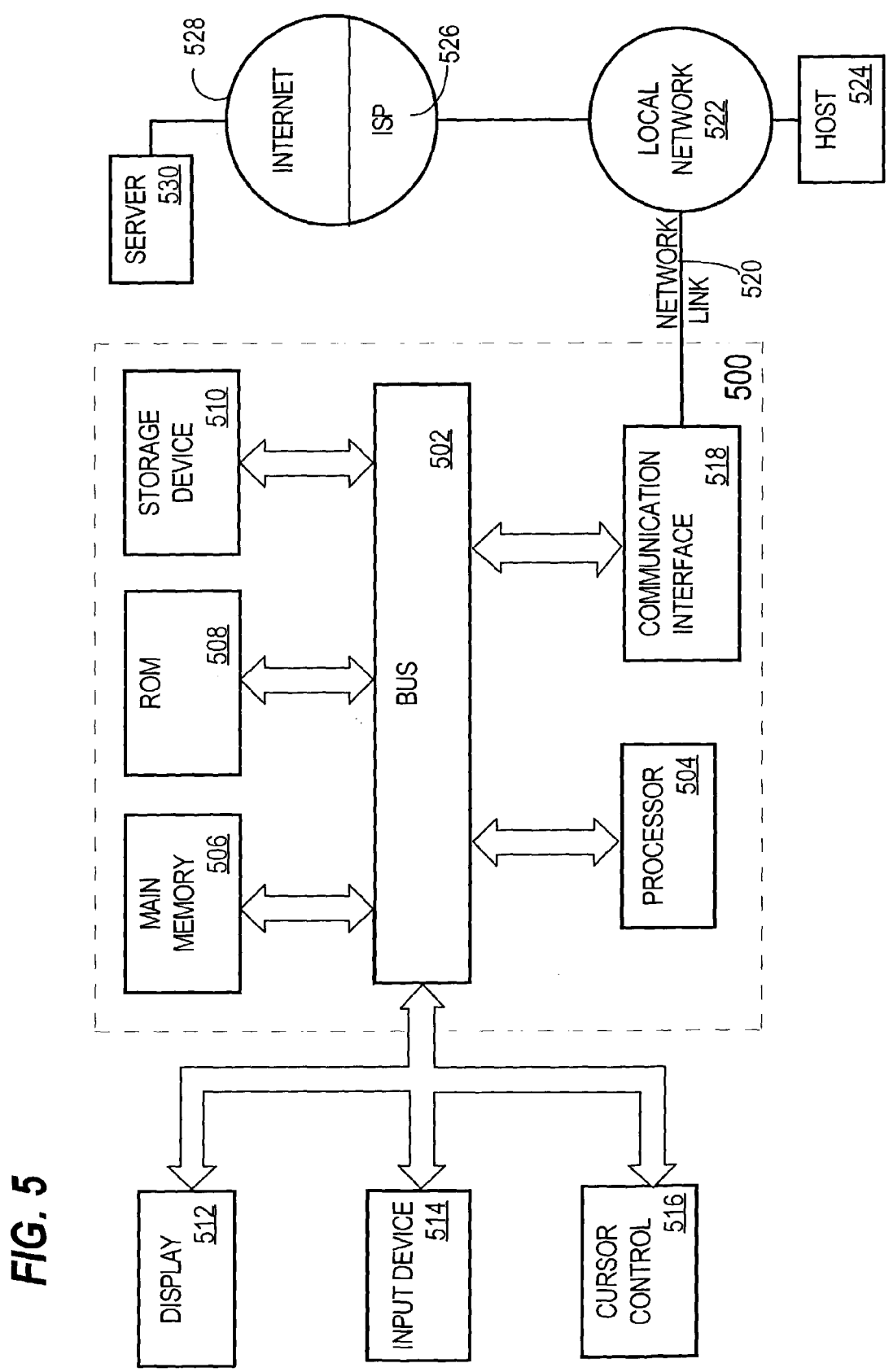
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical, magnetic, or magneto-optical disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, DVD, any other optical or magneto-optical medium, punchcards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments are described with reference to single and multiple instance database applications; however, the techniques described herein can be used with applications other than database application. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for migrating a single-instance application to a multiple-instance environment, the method comprising the computer-implemented steps of:

automatically creating a multiple-instance application by automatically linking a single-instance binary of the single-instance application to one or more libraries that include routines with logic designed for multiple-instance environments;

wherein the single instance application was created by linking the single-instance binary to one or more libraries that include routines with logic designed for single-instance environments;

automatically creating multiple-instance metadata that represents the structure of the multiple instance application; wherein the multiple instance metadata is created based on metadata that represents the structure of the single-instance application;

importing into the multiple-instance application, data that was used by the single-instance application; configuring the multiple-instance environment for executing multiple instances of the multiple-instance application within the multiple-instance environment; and configuring the multiple instances of the multiple-instance application to form an application group.

2. The method of claim 1, further comprising the computer-implemented step of:

creating an image that represents data that was used by the single instance application; and capturing metadata that represents the structure of the single instance application.

3. The method of claim 1, further comprising the computer-implemented step of:

configuring multiple instances of the multiple instance application to perform as peers in an application group.

4. The method of claim 1, further comprising the computer-implemented step of:

registering multiple instances of the multiple instance application with a particular listener process of nodes on which multiple instances execute.

5. The method of claim 4, wherein the step of registering the multiple instances further comprises the computer-implemented steps of:

registering an instance of the multiple instances with a first listener process on a first node; and registering the instance with a second listener process on a second node.

6. The method of claim 4, further comprising the computer-implemented step of:

configuring multiple instances of the multiple instance application such that upon a failure of a first instance on a first node on which the first instance is executing, a second instance executing on a second node performs at least a portion of the operations that were to be performed by the first instance.

7. The method of claim 1, further comprising the computer-implemented step of:
balancing processing load among multiple instances of the multiple instance application.

8. The method of claim 1, wherein the single instance and multiple instance applications are database applications.

9. The method of claim 8, further comprising the computer-implemented step of:
allocating separate storage resources for undo information for each instance of the multiple instance application.

10. The method of claim 8, further comprising the computer-implemented step of:
creating a redo thread having at least two redo group logs for each instance of the multiple instance application.

11. The method of claim 1, wherein the step of automatically creating multiple instance metadata comprises the computer-implemented steps of:
automatically determining, based on metadata that represents the structure of the single instance application, at least one from a group consisting of the number, names and sizes of control files used by the single instance application; and
automatically creating the multiple instance metadata based on the at least one from the group.

12. The method of claim 1, wherein the step of automatically creating multiple instance metadata comprises the computer-implemented steps of:
automatically determining whether the undo management mode used by the single instance application is automatic mode or manual mode; and
automatically creating the multiple instance application metadata based on the undo management mode used by the single instance application.

13. The method of claim 12, wherein the step of automatically creating multiple instance metadata comprises the computer-implemented steps of:
if the undo management mode used by the single instance application was manual mode, then automatically determining the names of rollback segments used by the single instance application; and
automatically creating the multiple instance metadata based on the names of rollback segments used by the single instance application.

14. The method of claim 1, wherein the step of automatically creating multiple instance metadata comprises the computer-implemented steps of:
automatically determining, based on metadata that represents the structure of the single instance application, at least one from a group consisting of tablespace names, tablespace sizes and tablespace data file names used by the single instance application; and
automatically creating the multiple instance metadata based on the at least one from the group.

15. The method of claim 1, wherein the step of automatically creating multiple instance metadata comprises the computer-implemented steps of:
automatically determining, based on metadata that represents the structure of the single instance application, at least one from a group consisting of the number, names and sizes of redo log files used by the single instance application; and
automatically creating the multiple instance metadata based on the at least one from the group.

16. A computer-readable storage medium carrying one or more sequences of instructions for migrating a single-instance application to a multiple-instance environment, wherein execution of the one or more sequences of instructions by one or more processors causes the one or more processors to perform the steps of:
automatically creating a multiple instance application by automatically linking a single-instance binary of the single instance application to one or more libraries that include routines with logic designed for multiple-instance environments;
wherein the single instance application was created by linking the single-instance binary to one or more libraries that include routines with logic designed for single-instance environments;
automatically creating multiple-instance metadata that represents the structure of the multiple instance application; wherein the multiple instance metadata is created based on metadata that represents the structure of the single-instance application;
importing into the multiple-instance application, data that was used by the single-instance application; configuring the multiple-instance environment for executing multiple instances of the multiple-instance application within the multiple-instance environment, and configuring the multiple instances of the multiple-instance application to form an application group.

17. The computer-readable medium of claim 16, wherein execution of the one or more sequences of instructions by one or more processors causes the one or more processors to perform the steps of:
creating an image that represents data from the single instance application;
capturing metadata that represents the structure of the single instance application.

18. The computer-readable medium of claim 16, wherein execution of the one or more sequences of instructions by one or more processors causes the one or more processors to perform the steps of:
configuring multiple instances of the multiple instance application to perform as peers in an application group.

19. The computer-readable medium of claim 16, wherein execution of the one or more sequences of instructions by one or more processors causes the one or more processors to perform the steps of:
registering multiple instances of the multiple instance application with a particular listener process of nodes on which multiple instances execute.

20. The computer-readable medium of claim 19, wherein execution of the one or more sequences of instructions by one or more processors causes the one or more processors to perform the step of registering the multiple instances by performing the steps of:
registering an instance of the multiple instances with a first listener process on a first node; and
registering the instance with a second listener process on a second node.

21. The computer-readable medium of claim 19, wherein execution of the one or more sequences of instructions by one or more processors causes the one or more processors to perform the steps of:
configuring multiple instances of the multiple instance application such that upon a failure of a first instance on a first node on which the first instance is executing, a second instance executing on a second node performs at least a portion of the operations that were to be performed by the first instance.

22. The computer-readable medium of claim 16, wherein execution of the one or more sequences of instructions by one or more processors causes the one or more processors to perform the steps of:

balancing processing load among multiple instances of the multiple instance application.

23. The computer-readable medium of claim 16, wherein the single instance and multiple instance applications are database applications.

24. The computer-readable medium of claim 23, wherein execution of the one or more sequences of instructions by one or more processors causes the one or more processors to perform the steps of:
   allocating separate storage resources for undo information for each instance of the multiple instance application.

25. The computer-readable medium of claim 23, wherein execution of the one or more sequences of instructions by one or more processors causes the one or more processors to perform the steps of:
   creating a redo thread having at least two redo group logs for each instance of the multiple instance application.

26. The computer-readable medium of claim 16, wherein execution of the one or more sequences of instructions by one or more processors causes the one or more processors to perform the step of automatically creating multiple instance metadata by performing the computer-implemented steps of:
   automatically determining, based on metadata that represents the structure of the single instance application, at least one from a group consisting of the number, names and sizes of control files used by the single instance application; and
   automatically creating the multiple instance metadata based on the at least one from the group.

27. The computer-readable medium of claim 16, wherein execution of the one or more sequences of instructions by one or more processors causes the one or more processors to perform the step of automatically creating multiple instance metadata by performing the computer-implemented steps of:
   automatically determining whether the undo management mode used by the single instance application is automatic mode or manual mode; and
   automatically creating the multiple instance metadata based on the undo management mode used by the single instance application.

28. The computer-readable medium of claim 27, wherein the step of automatically creating multiple instance metadata comprises the computer-implemented steps of:
   if the undo management mode used by the single instance application was manual mode, then performing the computer-implemented step of automatically determining the names of rollback segments used by the single instance application; and
   automatically creating the multiple instance metadata based on the names of rollback segments used by the single instance application.

29. The computer-readable medium of claim 16, wherein execution of the one or more sequences of instructions by one or more processors causes the one or more processors to perform the step of automatically creating multiple instance metadata by performing the computer-implemented steps of:
   automatically determining, based on metadata that represents the structure of the single instance application, at least one from a group consisting of the tablespace names, tablespace sizes and tablespace data file names used by the single instance application; and
   automatically creating the multiple instance metadata based on the at least one from the group.

30. The computer-readable medium of claim 16, wherein execution of the one or more sequences of instructions by one or more processors causes the one or more processors to perform the step of automatically creating multiple instance metadata by performing the computer-implemented steps of:
   automatically determining, based on metadata that represents the structure of the single instance application, at least one from a group consisting of the number, names and sizes of redo log files used by the single instance application; and
   automatically creating the multiple instance metadata based on the at least one from the group.

31. A computer apparatus for migrating a single-instance application to a multiple-instance environment, the apparatus comprising:
   means for automatically creating a multiple instance application by automatically linking a single-instance binary of the single instance application to one or more libraries that include routines with logic designed for multiple-instance environments;
   wherein the single instance application was created by linking the single-instance binary to one or more libraries that include routines with logic designed for single-instance environments;
   means for automatically creating multiple-instance metadata that represents the structure of the multiple instance application; wherein the multiple instance metadata is created based on metadata that represents the structure of the single-instance application;
   means for importing into the multiple-instance application, data that was used by the single instance application; means for configuring the multiple-instance environment for executing multiple instances of the multiple-instance application within the multiple-instance environment; and means for configuring the multiple instances of the multiple-instance application to form an application group.

* * * * *

UNITED STATES PATENT AND TRADEMARK OFFICE
CERTIFICATE OF CORRECTION

PATENT NO. : 7,069,270 B1
APPLICATION NO. : 10/360257
DATED : June 27, 2006
INVENTOR(S) : Raj Kumar It is certified that error appears in the above-identified patent and that said Letters Patent is hereby corrected as shown below:

Column 14
Claim 16: Line 21, delete "environment," and insert --environment;--.

Claim 17: Line 29, delete "instance application;" and insert -- instance application; and--.

Signed and Sealed this

Twenty-ninth Day of August, 2006

JON W. DUDAS
*Director of the United States Patent and Trademark Office*